United States Patent
Liao et al.

(10) Patent No.: US 7,336,368 B2
(45) Date of Patent: Feb. 26, 2008

(54) OPTICAL DETECTING MODULE AND OPTICAL DETECTOR THEREOF

(75) Inventors: Pin-Chien Liao, Taoyuan County (TW); Kuo-Tong Ma, Taipei (TW)

(73) Assignee: Darfon Electronics Corp., Taoyuan (TW)

( * ) Notice: Subject to any disclaimer, the term of this patent is extended or adjusted under 35 U.S.C. 154(b) by 275 days.

(21) Appl. No.: 11/329,713

(22) Filed: Jan. 10, 2006

(65) Prior Publication Data

US 2006/0158654 A1    Jul. 20, 2006

(30) Foreign Application Priority Data

Jan. 18, 2005    (TW) .............................. 94101407 A

(51) Int. Cl.
*G01B 9/02* (2006.01)
*G01P 3/36* (2006.01)
*G09G 5/00* (2006.01)

(52) U.S. Cl. ..................... 356/498; 356/28.5; 345/166; 250/221

(58) Field of Classification Search .................... None
See application file for complete search history.

(56) References Cited

U.S. PATENT DOCUMENTS 6,233,045 B1 * 5/2001 Suni et al. .................. 356/28.5
6,707,027 B2 3/2004 Liess
7,126,586 B2 * 10/2006 Jianping et al. ............ 345/166

* cited by examiner

*Primary Examiner*—Gregory J. Toatley, Jr.
*Assistant Examiner*—Amanda H Merlino
(74) *Attorney, Agent, or Firm*—Quintero Law Office

(57) ABSTRACT

An optical detector measuring a movement of an object in a space on a measurement axis comprises a light source, a reflective portion, a detection unit and a converting unit. The light source comprises a resonance chamber, the light source emitting a laser beam toward the object, the laser beam contacting the object and generating a first scattering beam and a reflection beam, wherein a part of the first scattering beam enters the resonance chamber. The reflective portion reflects the reflection beam toward the object, the reflection beam re-contacting the object and generating a second scattering beam and a sub-reflection beam, wherein a part of the second scattering beam and the sub-reflection beam enter the resonance chamber. The detection unit measures an optical-electrical variation in the resonance chamber to generate an electric signal. The converting unit converts the electric signal to a movement on the measurement axis in the space.

14 Claims, 8 Drawing Sheets

OPTICAL DETECTING MODULE AND OPTICAL DETECTOR THEREOF

BACKGROUND OF THE INVENTION

1. Field of the Invention

The invention relates to an optical detector, and in particular to an optical detector with decreases manufacturing costs.

2. Description of the Related Art

FIG. 1a shows a conventional optical detector, wherein a laser diode 30 emits a laser beam 31 toward an object 20 moving on a measurement surface 10. The laser beam 31 contacts the object 20 and generates a reflection beam 33 and a first scattering beam 32. The object 20 moves on an x-axis, and Doppler frequency shifts the first scattering beam 32. When the first scattering beam 32 backs to a resonance chamber (not shown) in the laser diode 30, a self-mixing effect occurs in the resonance chamber to generate an optical-electrical variation. A movement on the x-axis of the object 20 and a click motion thereof are measured via measuring the optical-electrical variation by a photodiode.

A measurement effect of the conventional optical detector is related to a first angle $\theta$ between the laser beam 31 and the measurement surface 10. With reference to FIG. 1b, when the first angle $\theta$ is close to 90°, the first scattering beam is aimed at the resonance chamber of the laser diode 30, and a self-mixing in the resonance chamber is obvious. However, the path of the laser beam 31 and the first scattering beam 32 is perpendicular to a movement direction of the object 30. Thus, the first scattering beam 32 comprises no component on the x-axis and no Doppler frequency shift.

With reference to FIG. 1c, when the first angle $\theta$ nears 0°, the first scattering beam 32 comprises sufficient component on the x-axis and an obvious Doppler frequency shift. However, as shown in FIG. 1c, the first scattering beam 32 is not aimed at the resonance chamber, there is insufficient first scattering beam 32 traveling into the resonance chamber, and self-mixing in the resonance chamber fails.

BRIEF SUMMARY OF THE INVENTION

A detailed description is given in the following embodiments with reference to the accompanying drawings.

An optical detector measuring movement of an object in a space on a measurement axis comprises a light source, a reflective portion, a detection unit and a converting unit. The light source comprises a resonance chamber, the light source emitting a laser beam toward the object, the laser beam contacting the object and generating a first scattering beam and a reflection beam, wherein a part of the first scattering beam enters the resonance chamber. The reflective portion reflects the reflection beam toward the object, the reflection beam re-contacting the object and generating a second scattering beam and a sub-reflection beam, wherein a part of the second scattering beam and the sub-reflection beam enter the resonance chamber. The detection unit measures an optical-electrical variation in the resonance chamber to generate an electric signal. The converting unit converts the electric signal to a movement on the measurement axis in the space, wherein the first scattering beam, the second scattering beam and the sub-reflection beam are Doppler frequency shifted, and the optical-electrical variation is generated via a self-mixing of the first scattering beam and the second scattering beam.

The detection unit selectively measures the second scattering beam and the sub-reflection beam according to boundary conditions, such as angle, self-mixing ratio or signal quality.

The invention reduces the first angle $\theta$ between the laser beam and the measurement surface to improve a sensibility of the optical detector. Additionally, signal conversion cost between the optical-electrical variation and the electric signal is reduced via increasing optical-electrical variation in the resonance chamber.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
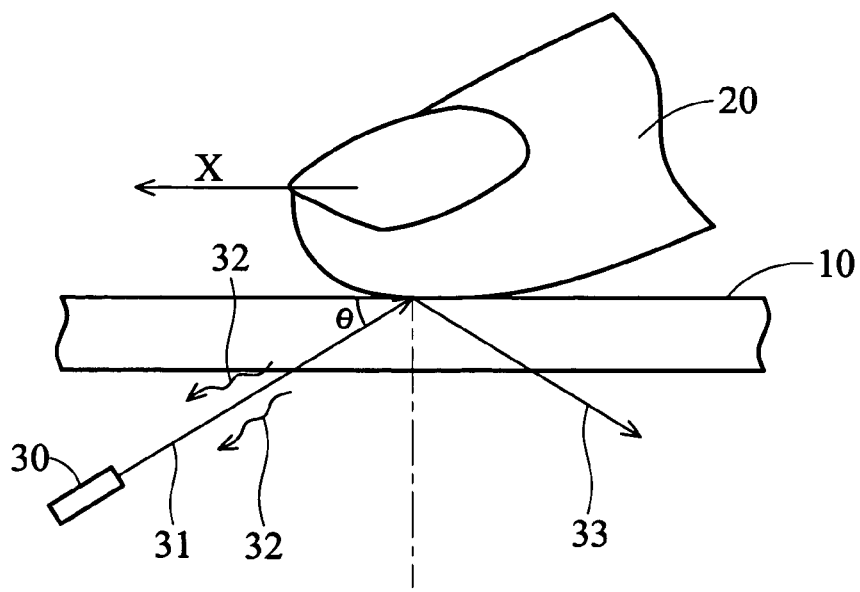
FIG. 1a shows a conventional optical detector.
Figure 1B:
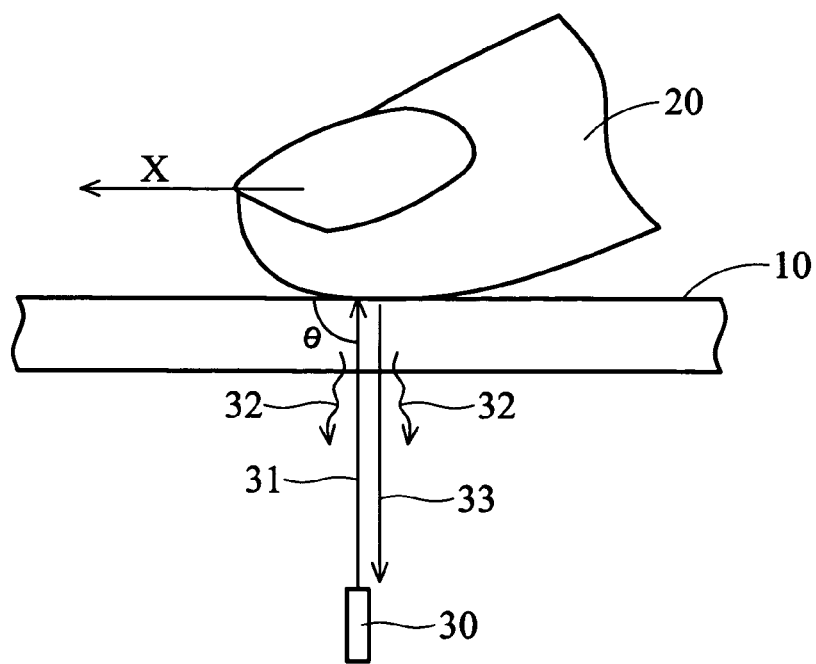
FIG. 1b shows a first angle between a laser beam and a measurement surface close to 90°.
Figure 1C:
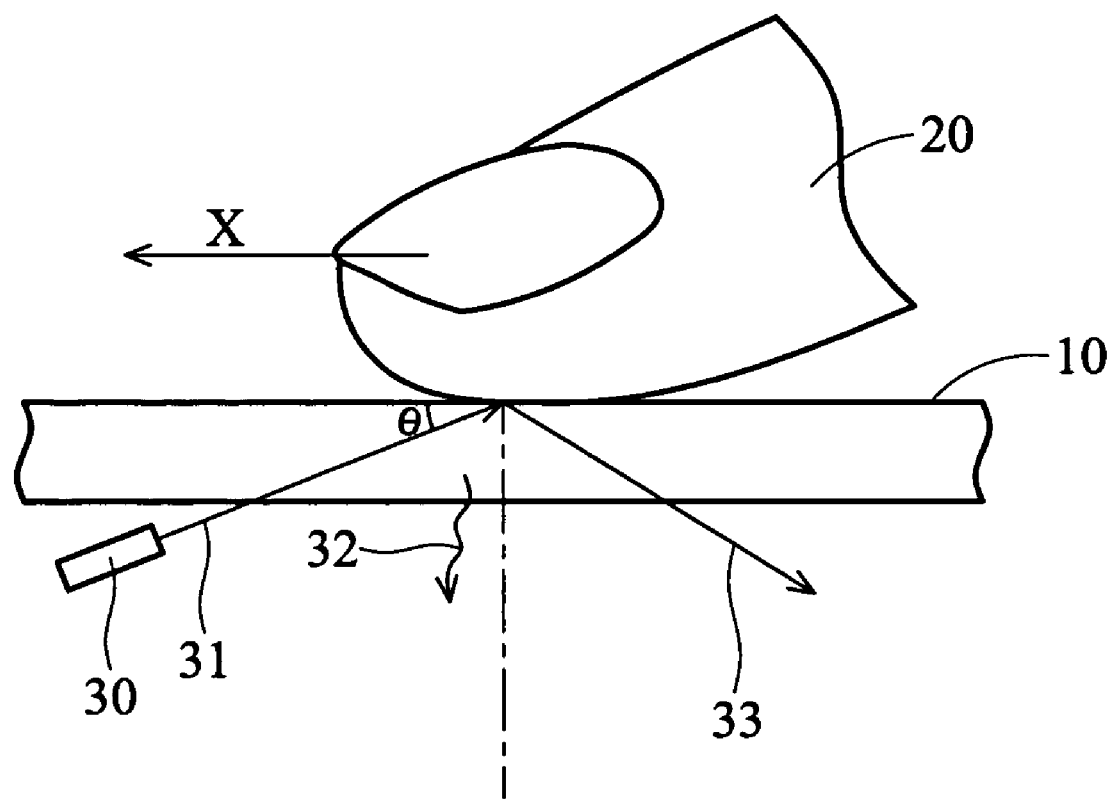
FIG. 1c shows the first angle between a laser beam and a measurement surface near 0°.
Figure 2A:
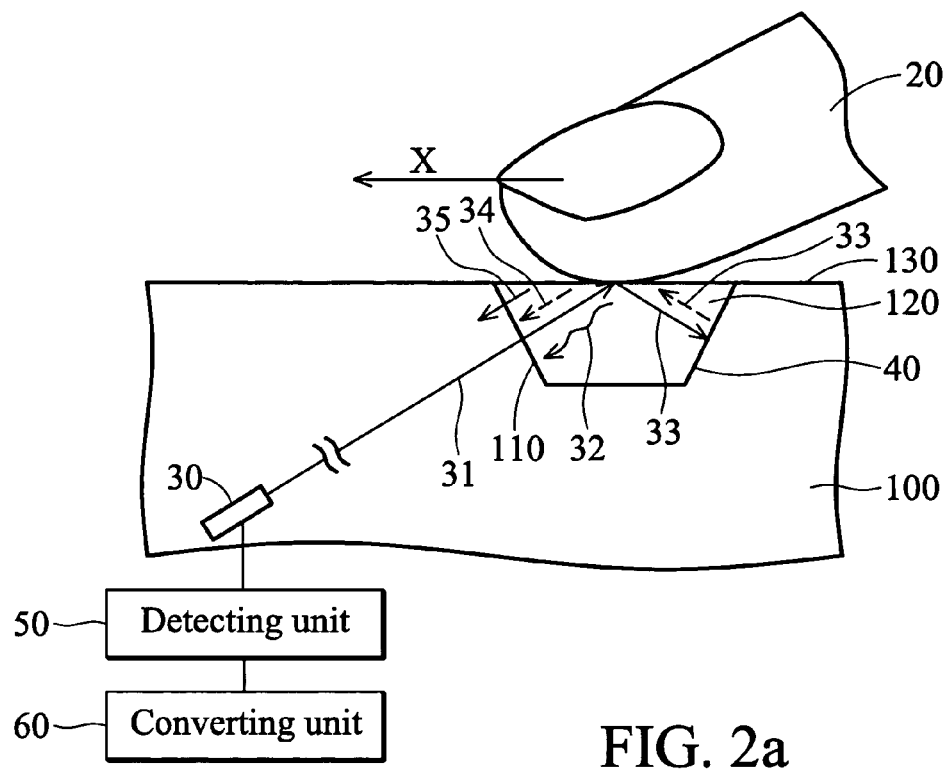
FIG. 2a shows a first embodiment of the invention.

FIG. 2a shows a first embodiment of the invention, which comprises a light source (laser diode) 30, a light guide 100, a detecting unit 50 and a converting unit 60. The light source 30 comprises a resonance chamber (not shown). The light guide 100 comprises a recess 120 comprising a first light emitting surface 110 and reflective portion 40. The first light emitting surface 110 and the reflective portion 40 are located on sidewalls of the recess 120. The detecting unit 50 is coupled to the light source 30. The converting unit 60 is coupled to the detecting unit 50.

The light source 30 emits a laser beam 31 toward an object 20. The laser beam 31 travels out of the light guide 100 from the first light emitting surface 110, contacts the object 20, and generates a first scattering beam 32 and a reflection beam 33. A part of the first scattering beam 32 travels into the resonance chamber. The reflection beam 33 is reflected by the reflective portion 40 to the object 20. The reflection beam 33 contacts the object 20, and generates a second scattering beam 34 and a sub-reflection beam 35. A part of the second scattering beam 34 travels into the resonance chamber. When the laser beam 31 and the reflection beam 33 contact the object 20, the object 20 moves on an x-axis on a measurement surface 130, and the first scattering beam 32, the sub-reflection beam 35 and the second scattering beam 34 are Doppler frequency shifted. The first scattering beam 32, the sub-reflection beam 35 and the second scattering beam 34 enter the resonance chamber, and are self-mixed to generate an optical-electrical variation in the resonance chamber. The detecting unit 50 measures an electrical variation in the resonance chamber, and generates an electrical signal. The converting unit 60 converts the electrical signal to movement data on a measurement axis (x-axis and/or y-axis) in the space.

The reflective portion 40 is a planar surface, a simple sidewall of the recess 120 (according to Fresnel law, an alternation of medium reflects light) or a sidewall coated with reflective material.

Figure 2B:
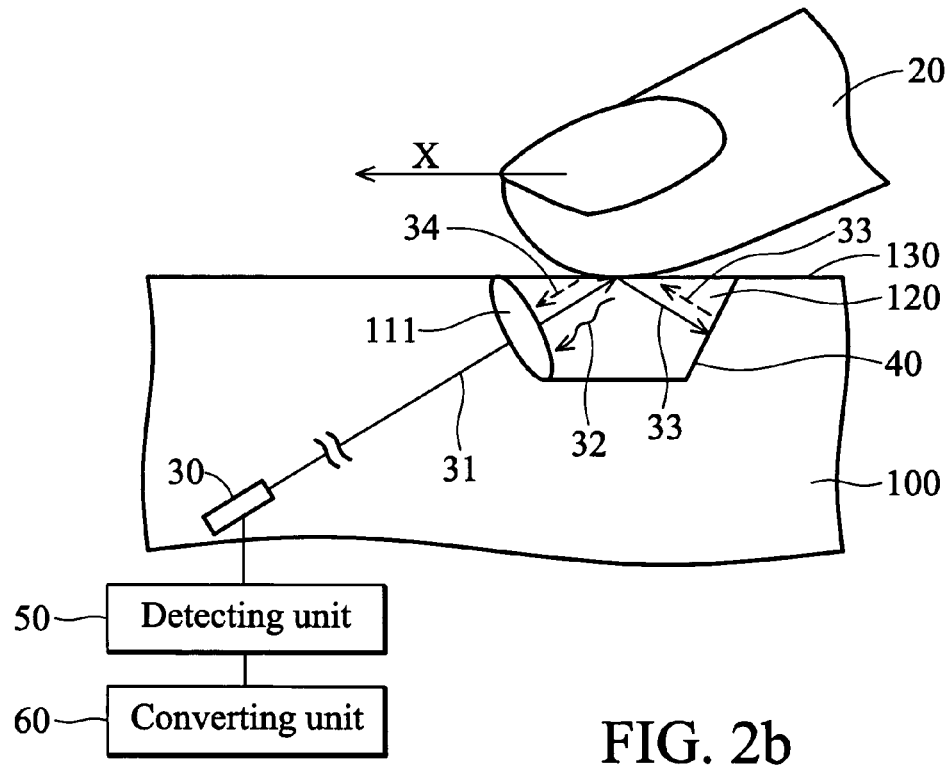
FIG. 2b shows a modified form of the first embodiment.

FIG. 2b shows a modified form of the first embodiment of the invention, wherein a lens structure 111 is formed on the first light emitting surface to focus the laser beam 31.

Figure 2C:
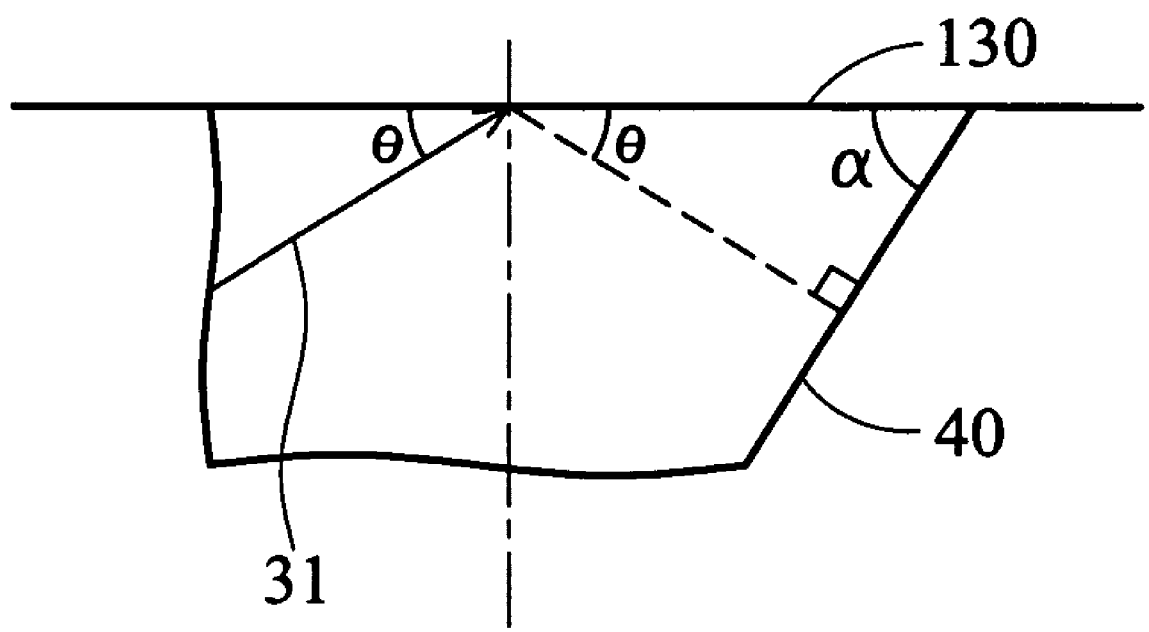
FIG. 2c shows a relationship between an orientation of a reflective portion and an emitting angle of the laser beam.

FIG. 2c shows a relationship between orientation of the reflective portion 40 and emitting angle of the laser beam 31. A first angle θ is formed between the laser beam 31 and the measurement surface 130. A second angle α is formed between the reflective portion 40 and the measurement surface 130. The first angle θ is between 0° and 90°. A sum of the first angle θ and the second angle α is about 90°.

The first scattering beam 32 and the second scattering beam 34 enter the resonance chamber. Compared with the related art, the resonance chamber of the invention additionally receives the second scattering beam 34 and the sub-reflection beam 35 because the reflection beam 33 contacts the object twice to generate the second scattering beam 34. The self-mixing effect and optical-electrical variation in the resonance chamber is increased. Thus, the first angle θ can be reduced to improve a sensibility of the optical detector. Additionally, signal conversion cost between the optical-electrical variation and the electric signal is reduced via increasing optical-electrical variation in the resonance chamber.

Figure 3:
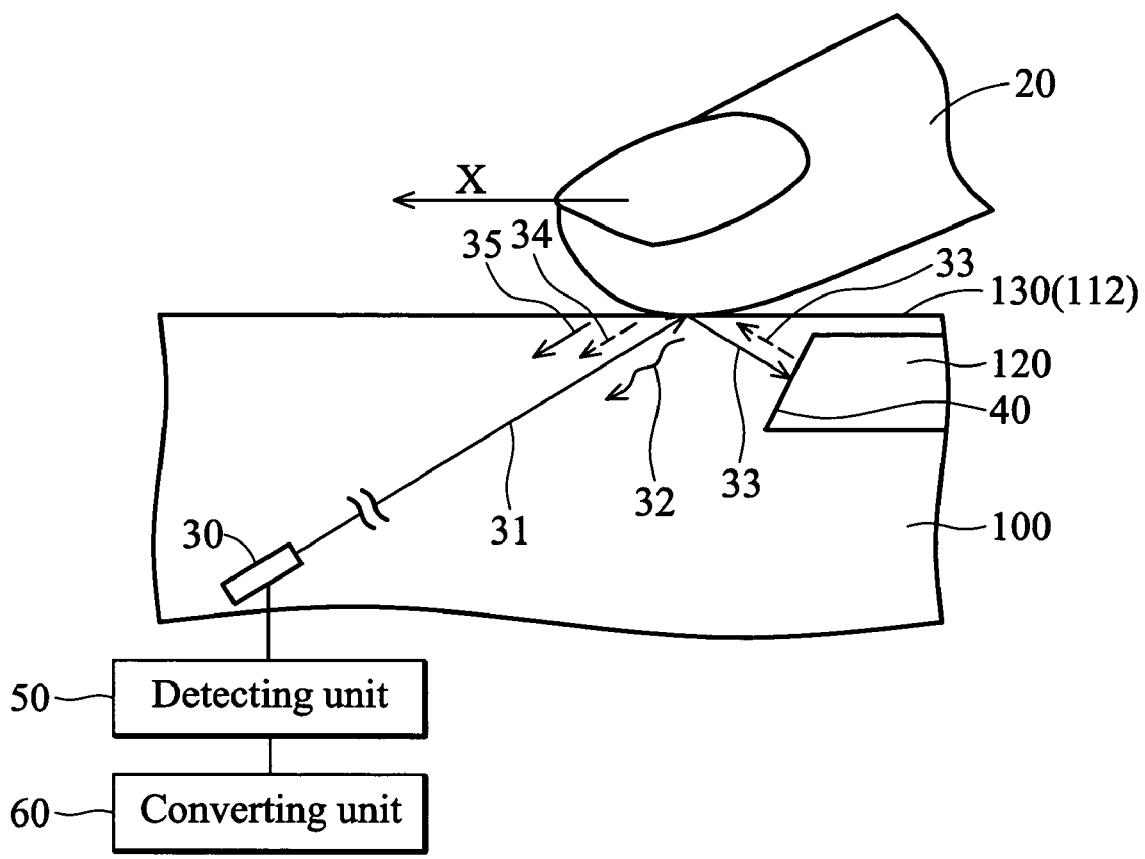
FIG. 3 shows a second embodiment of the invention.

FIG. 3 shows a second embodiment of the invention, wherein the laser beam 31, the first scattering beam 32, the reflection beam 33, the sub-reflection beam 35 and the second scattering beam 34 travel in the light guide 100. The laser beam 31 and the reflection beam 33 are emitted out of the light guide 100 through a second light emitting surface 112 (measurement surface 130) to contact the object 20. The recess 120 alters the light transmitting medium to reflect the reflective light 33. The reflective portion 40 is a simple planar surface located on a sidewall of the recess 120 or a planar surface coated with light reflective material.

Figure 4A:
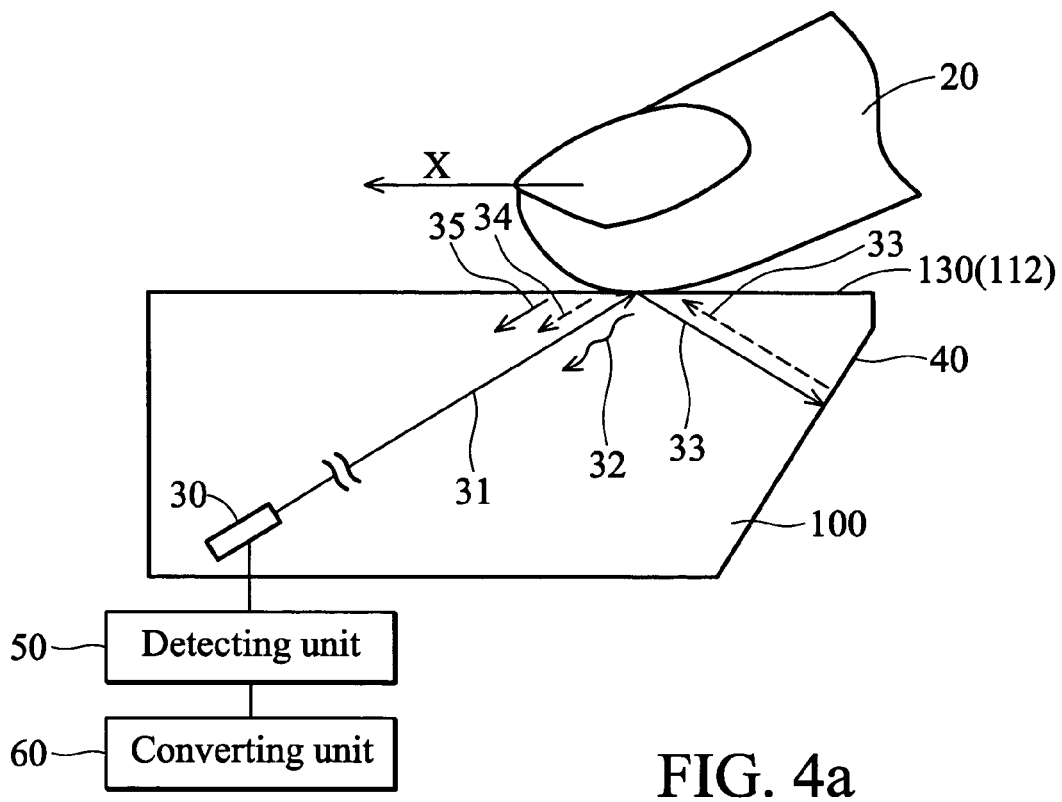
FIG. 4a shows a third embodiment of the invention.

FIG. 4a shows a third embodiment of the invention, wherein the light guide 100 is a polyhedron. The reflective portion 40 is located on a surface of the light guide 100. The laser beam 31, the first scattering beam 32, the reflection beam 33, the sub-reflection beam 35 and the second scattering beam 34 travel in the light guide 100. The laser beam 31 and the reflection beam 33 are emitted out of the light guide 100 through a second light emitting surface 112 (measurement surface 130) to contact the object 20. The reflective portion 40 is a planar surface located on a sidewall of the recess 120 or a planar surface coated with light reflective material.

Figure 4B:
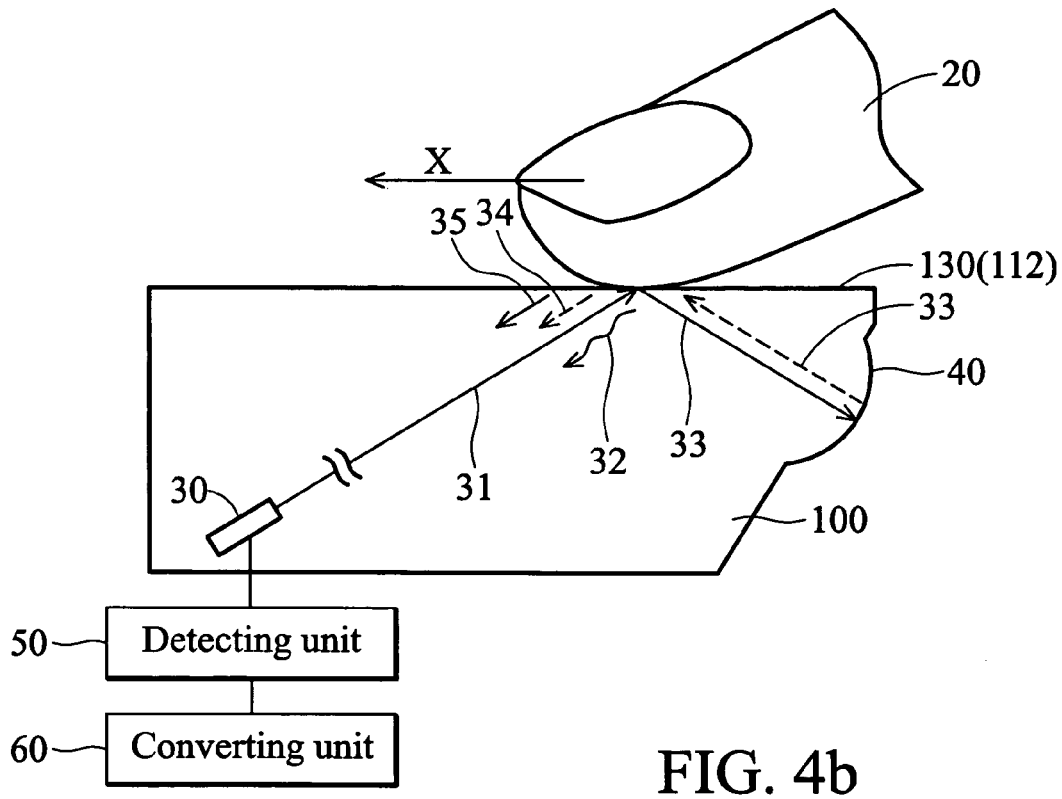
FIG. 4b shows a modified form of the third embodiment.

FIG. 4b shows a modified form of the third embodiment, wherein the reflective portion 40 is a curved surface. The reflective portion 40 can also be in other shapes to reflect light.

Figure 5:
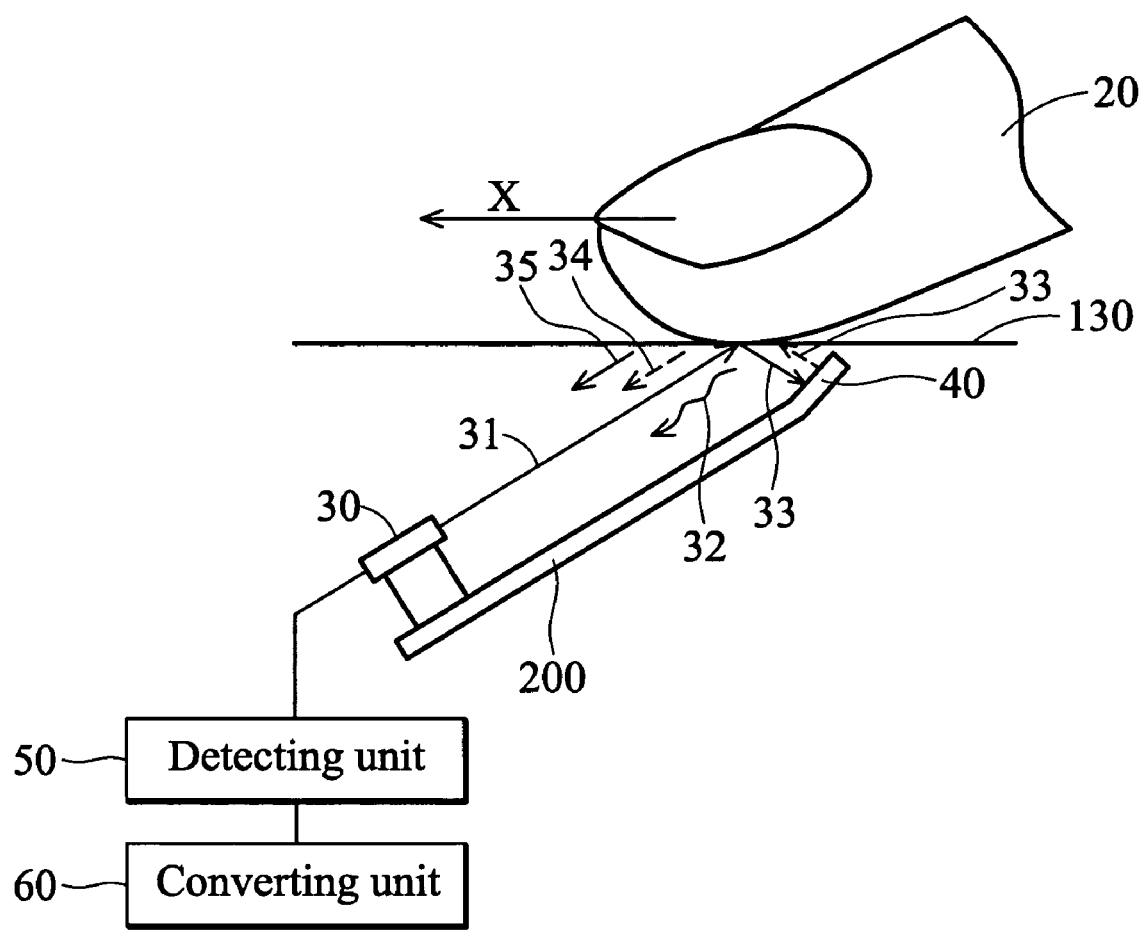
FIG. 5 shows a fourth embodiment of the invention.

FIG. 5 shows a fourth embodiment of the invention, which comprises a longitudinal supporting plate 200. The light source 30 is disposed on an end of the supporting plate 200, and the reflective portion 40 is disposed on another end of the supporting plate 200. The light source 30 emits a laser beam 31 toward the object 20. The laser beam 31 contacts the object 20, and generates a first scattering beam 32 and a reflection beam 33. A part of the first scattering beam 32 enters the resonance chamber. The reflection beam 33 travels back to the object 20 from the reflective portion 40. The reflection beam 33 contacts the object 20, and generates a second scattering beam 34 and a sub-reflection beam 35. The second scattering beam 34 and a part of the sub-reflection beam 35 travel into the resonance chamber. An angle between the reflective portion 40 and the supporting plate 200 can be modified, and the measurement surface 130 is a fictitious or a substantial surface.

Figure 6A:
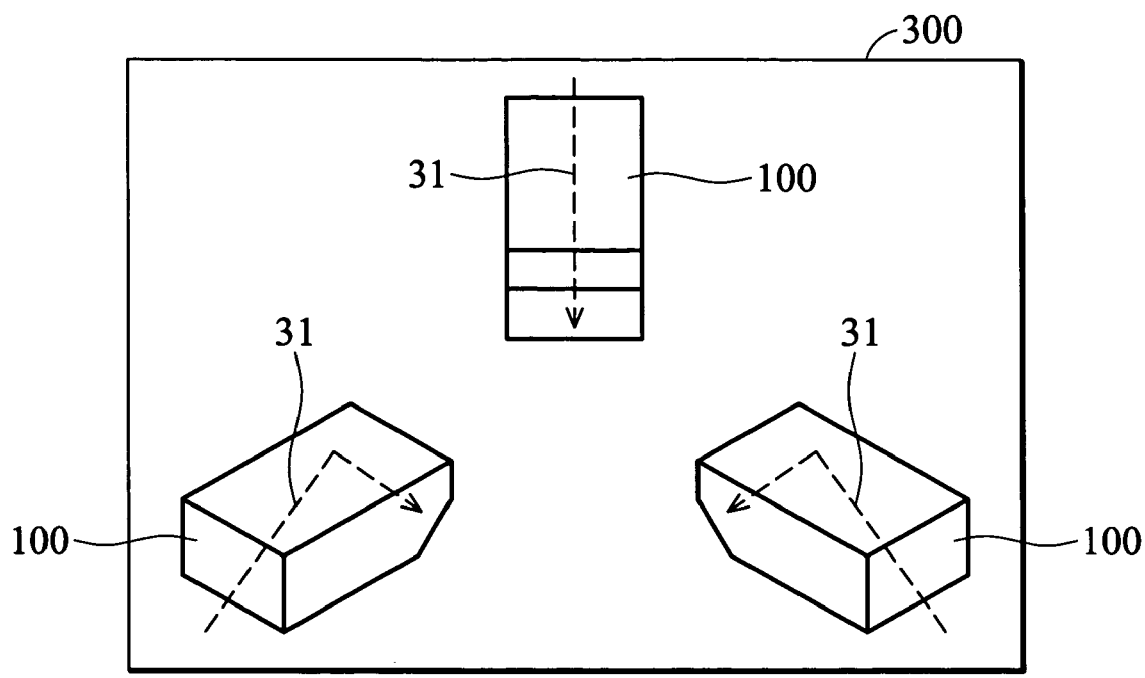
FIG. 6a shows a fifth embodiment of the invention.

FIG. 6a shows an optical detecting module of a fifth embodiment of the invention, which comprises three optical detectors of the third embodiment (in FIG. 6a, the optical detectors are represented by light guides 100 to simplify the description). The light sources and the light guides are arranged in included angles about 120°±30°, and the laser beams are emitted toward the object to measure the movement of the object multiaxially. The light guides 100 can be integrally formed into a single light guide element.

Figure 6B:
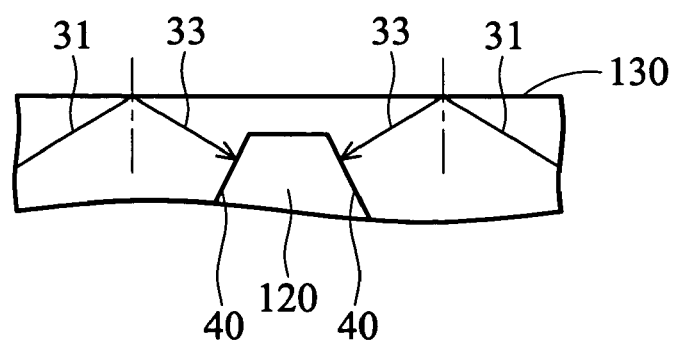
FIG. 6b shows a modified form of the fifth embodiment.

FIG. 6b shows a modified form of the fifth embodiment, which utilizes the optical detector of the second embodiment, wherein recesses thereof comprise a plurality of reflective surfaces (reflective portions) to reflect laser beams.

The invention reduces the first angle θ between the laser beam and the measurement surface to improve sensitivity of the optical detector. Additionally, signal conversion costs between the optical-electrical variation and the electric signal are reduced by increasing optical-electrical variation in the resonance chamber.

In the embodiments of the invention, the optical detector measures a movement of the object. However, the invention can be utilized in measuring a movement of the optical detector.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical detector for measuring a movement of an object in a space on a measurement axis, comprising:

a light source, comprising a resonance chamber, the light source emitting a laser beam toward the object, the laser beam contacting the object and generating a first scattering beam and a reflection beam, wherein a part of the first scattering beam enters the resonance chamber;

a reflective portion, reflecting the reflection beam toward the object, the reflection beam re-contacting the object and generating a second scattering beam and a sub-reflection beam, wherein a part of the second scattering beam and the sub-reflection beam enter the resonance chamber;

a detection unit, measuring an optical-electrical variation in the resonance chamber to generate an electric signal; and a converting unit, converting the electric signal to a movement on the measurement axis in the space, wherein the first scattering beam, the second scattering beam and the sub-reflection beam are Doppler frequency shifted, and the optical-electrical variation is generated via a self-mixing of the first scattering beam and the second scattering beam.

2. The optical detector as claimed in claim 1, further comprising a light guide comprising a recess on a surface thereof in which the reflective portion is located, the recess comprising a first light emitting surface disposed therein, and the laser beam passes the light guide and the first light emitting surface to contact the object.

3. The optical detector as claimed in claim 1, wherein the light guide further comprises a lens structure formed on the first light emitting surface, the laser beam passes the lens structure, and contacts the object.

4. The optical detector as claimed in claim 1, further comprising a light guide comprising a recess and a light emitting surface, wherein the recess is disposed in the light guide, the reflective portion is located in the recess, the light emitting surface is on a surface of the light guide, and the laser beam passes the light guide and the light emitting surface to contact the object.

5. The optical detector as claimed in claim 1, further comprising a light guide, which is a polyhedron, comprising a light emitting surface disposed on a surface thereof, wherein the reflective portion is disposed on another surface of the light guide, the object moves on the light emitting surface, and the laser beam passes the light guide and the light emitting surface to contact the object.

6. The optical detector as claimed in claim 1, wherein the reflective portion is coated with reflective material.

7. The optical detector as claimed in claim 1, further comprising a measurement surface, wherein the object moves on the measurement surface, a first angle is formed between the laser beam and the measurement surface, and the first angle is between 0° and 90°.

8. The optical detector as claimed in claim 7, wherein the measurement surface is a fictitious or a substantial surface.

9. The optical detector as claimed in claim 8, wherein the reflective portion is a planar surface, a second angle is formed between the reflective portion and the measurement surface, and a sum of the first and the second angles is 90°.

10. The optical detector as claimed in claim 1, further comprising a supporting plate, which is longitudinal, wherein the light source is disposed on an end of the supporting plate, and the reflective portion is disposed on another end of the supporting plate.

11. The optical detector as claimed in claim 1, wherein the reflective portion is curved.

12. An optical detecting module, comprising three optical detectors as claimed in claim 1, wherein the light sources and the reflective portions thereof are arranged in included angles about 120°, and the laser beams are emitted toward the object.

13. An optical detecting module, comprising three optical detectors as claimed in claim 5, wherein the light sources and the reflective portions thereof are arranged in included angles about 120°, and the laser beams are emitted toward the measurement surface.

14. The optical detecting module as claimed in claim 13, wherein the light guides are integrally formed.

* * * * *